Figure 1:
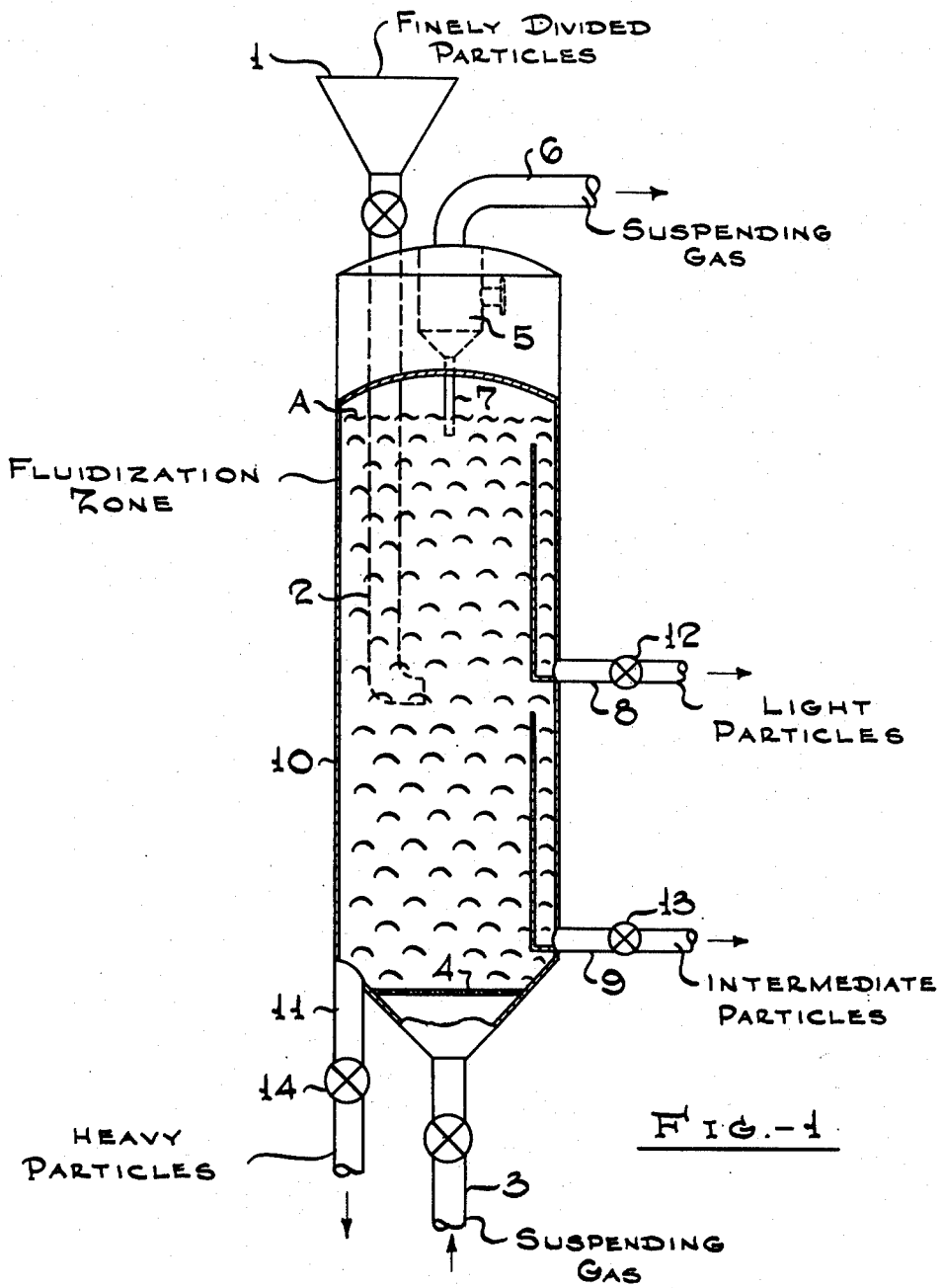

July 24, 1951 G. L. MATHESON 2,561,396
SEGREGATION OF SOLID PARTICLES
Filed Oct. 9, 1946 3 Sheets-Sheet 1

George L. Matheson Inventor
By P. J. Whelan Attorney

Patented July 24, 1951

2,561,396

UNITED STATES PATENT OFFICE 2,561,396

SEGREGATION OF SOLID PARTICLES

George L. Matheson, Union, N. J., assignor to Standard Oil Development Company, a corporation of Delaware Application October 9, 1946, Serial No. 702,184

5 Claims. (Cl. 209—474)

The present invention relates to an improved method of separating solid mixtures comprising particles having different particle sizes. The process more particularly relates to a fluidized process whereby solid mixtures may be readily segregated into fractions of different particle sizes. In accordance with my invention the solid mixture is introduced into a fluidization zone in which the solids are suspended in an upflowing gas under conditions to maintain a gradient of different particle sizes throughout the fluidization zone. Various streams of fluidized particles are withdrawn from the fluidization zone and preferably segrated and handled as hereinafter described.

It has, heretofore, been known in the art to contact gases and solids by passing the gases upwardly through an enlarged contacting zone containing a body of finely divided solids to be contacted at a controlled velocity to maintain the solids in said contacting zone in a quasi-liquid like state. Under properly controlled conditions, the subdivided solid particles are not only maintained in a highly turbulent, quasi-liquid state, but there exists a rapid and overall circulation of the fluidized solids throughout the fluid bed.

I have now discovered that providing the fluidized zone contains solid nonfluidized packing elements, overall circulation of the fluidized particles is prevented. I have also discovered that under these conditions it is possible to secure a gradient of particles having different particle sizes throughout the fluidization zone. In accordance with my invention the fluidization zone is filled, or partially filled, with packing or dispersing elements adequately spaced to provide a labyrinth of discontinuous passageways in which the gases are in contact with the finely divided fluidized solids which are maintained in a quasi-liquid condition. These dispersing or packing elements prevent the overall swirling or rapid circulation of the solids throughout the full length and breadth of the reactor and also tend to break up and disperse the larger gas bubbles which tend to form.

The size and character of the packing, as well as its employment in the fluid zone, may vary appreciably. For example, the packing or dispersing elements may be dumped into the reaction or fluid zone in random fashion, or the packing elements may be made to assume predetermined geometric patterns. It has been found that, other factors being equal, the density of the fluidized mixture in the reactor will vary inversely as the size of the packing elements. For example, the larger size packing elements will produce a lower density of the fluid bed at a given velocity and for a given subdivided solid material than smaller size packing elements. Thus, it is possible to control, in some degree, the density of the fluidized solid mixture in the reactor without varying the velocity of the gas. This is very desirable since the optimum velocity for securing particle segregation may be selected and utilized in conjunction with correct packing size.

The dimensions and the style of the packing elements utilized may also be varied appreciably, depending upon the type of reactor employed, the velocities used, the particular reaction being carried out and the character and particle size of the solids being suspended. In general, the packing may vary from a minimum dimension of ¼ inch to a maximum dimension of 12 inches or more. Packing elements of the saddle type having a maximum dimension of 1 inch to 2 inches (for example Berl Saddles), are particularly suitable for most reactors.

Where the space occupied by the packing is not an important factor, the packing elements may be in the form of solid balls, spheres, cylinders, blocks, bricks and the like. However, where it is important to provide maximum space with minimum volume occupied by the packing or spacing elements, it is preferable to provide elements which give a maximum surface. These elements may, for example, be in the form of hollow cylinders, U-shaped elements resembling saddles, wire turnings or wire helices, and the like. Raschig rings may be used as such. When using wire helices as packing elements, it is preferred to provide burrs or crimps in the wire at spaced points around the circumference to avoid interlocking of coils. When using saddle-shaped elements, the elements should be designed to prevent close nesting of one saddle in another. As described hereinbefore it is to be understood that the term packing as used throughout this specification and the appended claims is defined to indicate a multitude of dispering elements of sufficient size to prevent fluidization of the elements, and adapted to provide a labyrinth of discontinuous passageways.

The spacing or packing elements may be made of any desired material capable of withstanding the conditions of operation. The elements may also be of heat-conducting material, such as metal (for example, aluminum), or the elements may be made of ceramic material or other heat-insulating material.

In order to successfully maintain a quasi-liquid phase of subdivided solids and gases in the passageways between the packing elements, the subdivided solids or powder to be segregated should be of such character as to be able to flow freely down through the interstices of the packing elements without becoming packed or agglomerated in the absence of an upflowing fluid. This quality of free-flowing in the interstices of the packing in the absence of a suspending fluid is a function of many factors, among which are included the density of the subdivided particles, particle size, contacting zone size with respect to length as to width, and particle size distribution. Thus, the finely divided solids used in the present invention must be of such particle size distribution as to be free-flowing without the aid of aeration. By this is meant, for example, that if a body of said solids having all sides and the bottom supported has the support on one side removed, the body will flow out that side in such a way as to leave a substantially uniformly inclined surface. As pointed out heretofore, the body is free-flowing if it will flow downwardly freely through the packing in the absence of aeration without bridging. In general, this characteristic is influenced by the content of fines in the subdivided solids having a diameter less than about 20 microns. Usually the content of such fines should not be greater than about 12% by volume since a percentage greater than this will render subdivided particles having particle distribution in the range from about 20 microns to 200 microns non-free-flowing. If the subdivided particles are free-flowing, it is possible to fluidize the subdivided particles in the interstices of the packing regardless of the relative sizes of the packing and the particle sizes of the subdivided particles, provided that the packing is sufficiently large to provide interstices each having a diameter greater than the diameter of the largest particle in the subdivided solids. In general, the packing should be such as to provide interstices having a length as compared to diameter of not greater than 15 to 1. Also the packing should be at least about 10 times as large as the largest particle to be fluidized.

A further test of a free-flowing body is that if such a body is packed under its own weight in a 60° funnel, it will flow through the funnel freely when released at the bottom.

A further illustration of free-flowing subdivided solids in the absence of aeration with respect to its successful fluidization between the interstices of solid nonfluidized packing in a treating zone is shown by the following data. The catalyst used was a silica gel catalyst impregnated with alumina (approximately 87½% silica and 12½% alumina).

| Silica-Alumina Catalyst, Micron Size | Operation A | Operation B |
|---|---|---|
| | Per cent | Per cent |
| 0–10 | 6.8 | 3.2 |
| 10–20 | 8.8 | 7.3 |
| 20–40 | 19.1 | 24.1 |
| 40–80 | 36.8 | 35.8 |
| 80+ | 28.5 | 29.6 |
| Free Flowing Through Interstices of Packing (No Aeration) | No | Yes |
| Successful Fluidization In Interstices of Packing | [1] No | Yes |

[1] Secured surging and channeling.

In these and similar operations, the reactor size with respect to length as compared to width was 15 to 1 or less. The packing comprised commercial packing of the size from ¼ to 12 inches, generally, in the range from ¼ to about 2 inches. Commercial type packings were used, such as Berl Saddles. The velocity[2] of upflowing gas was in the range from about 0.1 to 1.5 feet per second.

As another example, an iron catalyst having a micron size less than 44 was not free-flowing in the absence of aeration through the interstices of the packing. This iron catalyst could not be successfully fluidized in a packed zone. On the other hand, an iron catalyst having a micron size in the range from about 100 to 250 flowed freely through the interstices of the packing and could be successfully fluidized.

Also, if a silica catalyst impregnated with alumina, as previously described, has a uniform micron size of about 45, it will neither flow freely between the interstices of packing nor can it be successfully fluidized.

Whether or not small subdivided particles are free-flowing will vary with different materials and as described heretofore. However, its free-flowing characteristics in the absence of aeration may be readily determined by a simple test of the character indicated above. If a finely divided solid material is not free-flowing it can be made so by adjusting its particle size distribution. The packing is of the character which permits the maintenance of a fluidlike body of suspended solids between the spaces of the packing elements. As previously pointed out, the packing may be in the form of balls, spheres, cylinders, U-shaped elements, saddles, coils, metal turnings, helices, or equivalents. These packing elements should be of sufficient size or weight to prevent being suspended in the gas vapors passing upwardly through the reactor. The presence of these packing elements within the reaction zone tends to prevent overall swirling or recirculation of the suspended solid particles within the reaction zone.

Figure 2:
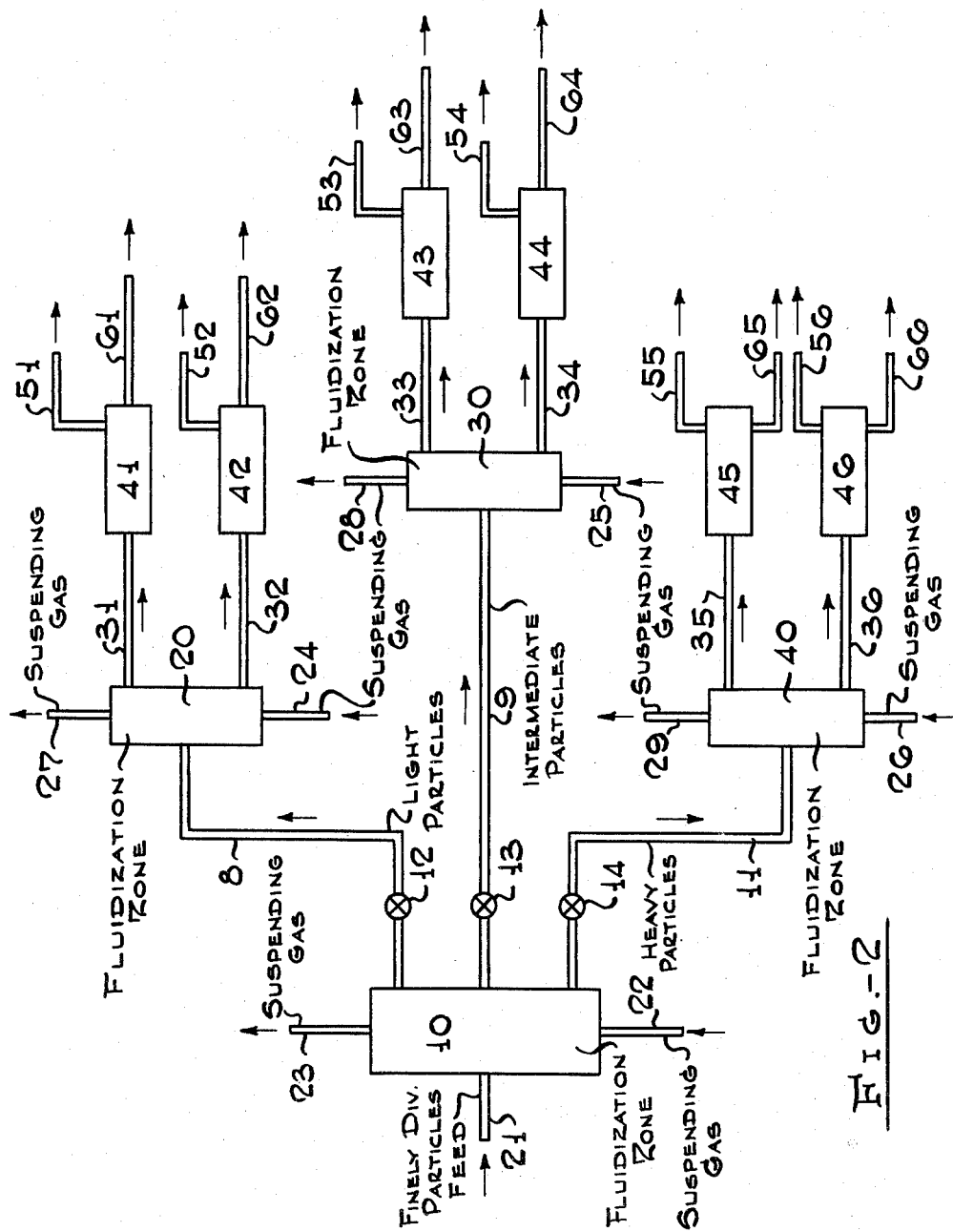
Figure 3:
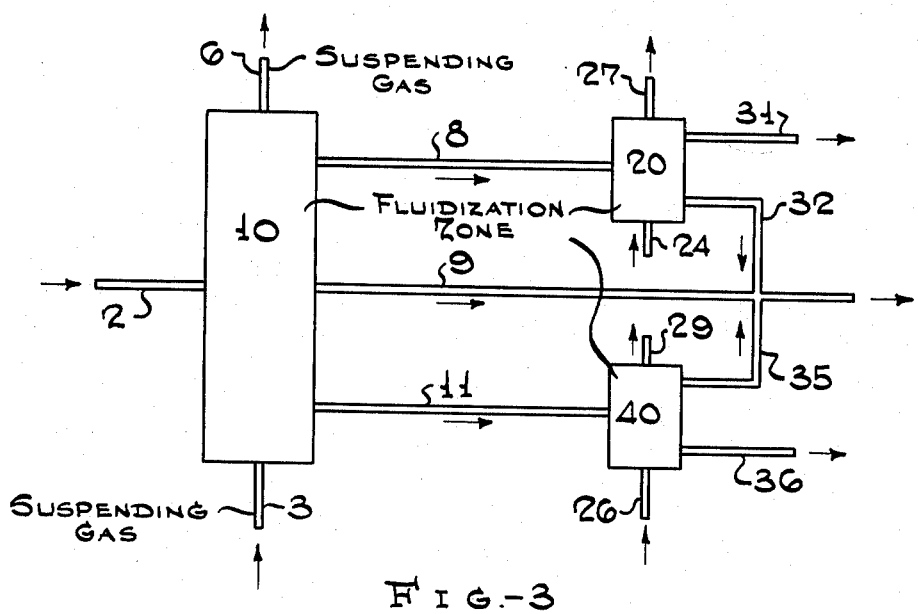
Figure 4:
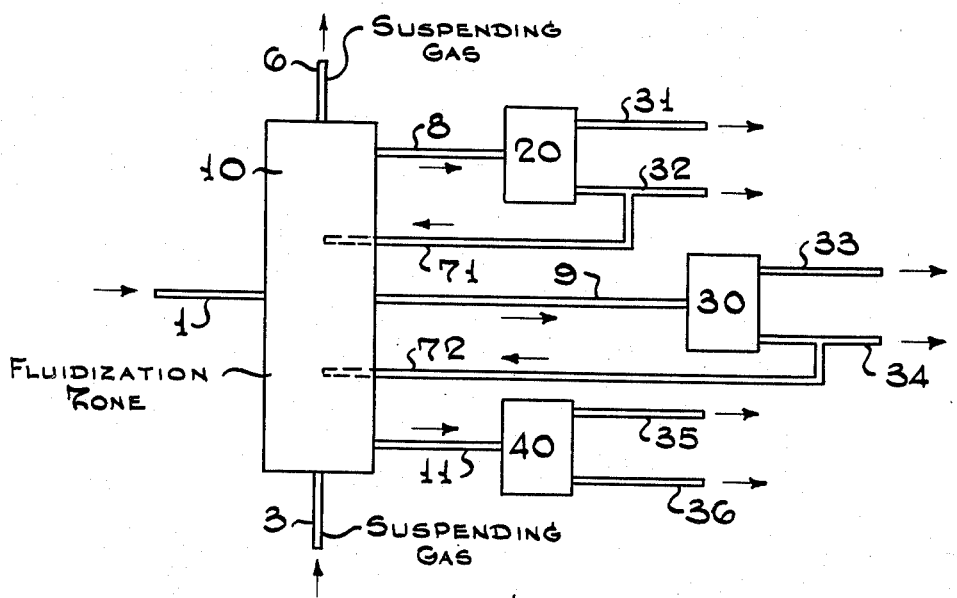

My invention may be more fully understood by reference to the attached drawings illustrating preferred modifications of the same. Fig. 1 illustrates an operation in which an initial fluidization zone only is employed. Figs. 2, 3 and 4 illustrate preferred modifications wherein a series of fluidization zones are employed, as well as, recycling of segregated fluid streams.

Referring specifically to Fig. 1, a mixture of finely divided solids having particle sizes in the range from about 1 to 500 microns and higher is introduced into fluidization zone 10 by means of feed hopper 1 and conduit 2. In accordance with my process fluidization zone 10 contains solid nonfluidized packing elements preferably throughout its full length, the upper level of which is at point A. However, it is within the concept of my invention to employ packing only partially through zone 10 or to employ different size packing in zone 10. The finely divided solid particles to be segregated are maintained in a fluid ebullient condition between the interstices of the nonfluidized elements by means of a suspending gas which is introduced into zone 10 by means of conduit 3 and distributing means 4. The velocity[2] of the upflowing suspending gas is in the range from about 0.1 ft./sec. to 4.0 ft./sec. The suspending gas is withdrawn from zone 10 through cyclone separator or equivalent means 5 by means of line 6. Solid particles removed from cyclone separator 5 are returned to the fluid bed by means of line 7. Under the conditions

[2] Velocity in the treating zone provided no solids are present.

as specified, the finely divided solid particles will form a gradient with respect to their buoyancies throughout zone 10. The more buoyant, lighter particles segregate in the upper area of zone 10 while the less buoyant and heavier particles segregate in the lower area of zone 10. Particles of intermediate buoyancy segregate in the intermediate area of zone 10. Thus, in accordance with my process, I withdraw from the upper area of zone 10 particles having a relatively small micron size by means of conduit 8. I withdraw from an intermediate area of zone 10 particles having intermediate buoyancies and weights by means of conduit 9. From the lower area of zone 10 I withdraw heavier particles having lower buoyancies by means of conduit 11. The amount of fluidized particles withdrawn by means of lines 8, 9 and 11 may be controlled by slide control valves 12, 13 and 14, or equivalent means respectively. The fluidized streams withdrawn through conduits 8, 9 and 11 are handled to separate the suspending gas from the segregated finely divided solids.

Referring specifically to Fig. 2 which illustrates an improved and preferred embodiment of the process illustrated with respect to Fig. 1. Zone 10 is entirely similar to that described with respect to Fig. 1. Fig. 2 is a diagrammatic sketch showing the flow of the fluid streams only. Fluidization zones 20, 30, and 40 are similar or equivalent to zone 10 as described with respect to Fig. 1. The feed mixture of finely divided solids to be segregated is introduced into zone 10 by means of line 21. The suspending gases are introduced by means of line 22 and withdrawn by means of line 23. The more buoyant fluid solid stream is withdrawn by means of line 8 controlled by valve 12, while the intermediate buoyant stream is withdrawn by line 9 controlled by valve 13. The less buoyant and heavier particles are withdrawn by means of line 11 controlled by valve 14. In accordance with this embodiment of my process the more buoyant, the intermediately buoyant, and the less buoyant streams are introduced into secondary fluidization zones 20, 30 and 40 respectively. Suspending gases are introduced into the respective zones by means of lines 24, 25 and 26 and withdrawn by means of lines 27, 28 and 29. Fluidization zones 20, 30 and 40 preferably contain packing throughout the entire area, which packing is preferably of a different size from the packing contained in initial fluidization zone 10. In general, I prefer that the size of the packing be smaller in zone 10 than the size of the packing in zones 20, 30 and 40. Thus, I have a higher density, other factors being equal in zone 10 than I have in the secondary fluidization zones 20, 30 and 40. Under these conditions a further segregation of the relatively lighter from the relatively heavier solid particles is secured in the respective fluidization zones. The fluidized streams from the respective fluidization zones are removed by means of lines 31, 32, 33, 34, 35 and 36. These streams are passed to separation zones 41, 42, 43, 44, 45 and 46 respectively in which the suspending gas is separated from the segregated finely divided solids. The suspending gas is withdrawn from the respective separation zones by means of lines 51, 52, 53, 54, 55 and 56. The segregated particles are removed from separation zones 41 to 46 inclusive by means of lines 61, 62, 63, 64, 65 and 66 respectively. These segregated solid particles having different micron sizes may be blended in any manner desirable to secure optimum particle size distribution, or they may be used without blending on operations where it is desirable to have a particularly narrow cut of particle size distribution.

Fig. 3 is a schematic sketch of my invention designed to remove from a solid mixture the relatively heavier and the relatively lighter particles. The feed stream comprising a finely divided solid mixture having different particle sizes is introduced into zone 10 by means of line 2. Suspending gases are introduced by means of line 3 and removed by means of line 6. As described with respect to Fig. 1, the more buoyant stream is removed by means of line 8, the intermediate buoyant stream by means of line 9, and the less buoyant stream by means of line 11. The secondary fluidization zones 20, and 40 are operated similar to that described with respect to Figs. 1 and 2. However, in accordance with this modification of my process, the less buoyant stream removed from secondary fluidization zone 20 by means of line 32 is combined with the intermediate buoyant stream removed from zone 10 by means of line 9. Also the more buoyant stream removed from zone 40 by means of line 35 is likewise combined with the intermediate buoyant stream removed from zone 10 by means of line 9. The more buoyant stream removed from zone 20, the combined intermediate buoyant stream removed from zone 10 and the less buoyant stream removed from zone 40 by means of line 36 are passed to separation zones for the recovery of the segregated solid particles from the suspending gases as described with respect to Fig. 2.

Fig. 4 describes an operation similar to that described with respect to Figs. 1 to 3. The finely divided solid mixture is introduced into zone 10 by means of line 1 while the suspending gases are introduced into zone 10 by means of line 3 and withdrawn by means of line 6. The more buoyant stream from zone 10 is introduced into secondary fluidized zone 20 by means of line 8. The intermediate buoyant stream from initial fluidization zone 10 is introduced into secondary fluidized zone 30 by means of line 9 while the less buoyant stream from zone 10 is introduced into secondary fluidization zone 40 by means of line 11. The more buoyant stream from zone 20 is removed by means of line 31, the more buoyant stream from zone 30 is removed by means of line 33 while the more buoyant stream from zone 40 is removed by means of line 35.

In accordance with this adaptation of my invention a portion of the less buoyant stream removed from zone 20 by means of line 32 is recycled to initial fluidization zone 10 by means of line 71. Also a portion of the less buoyant stream removed from secondary fluidization zone 34 is recycled to initial fluidization zone 10 by means of line 72. The less buoyant stream removed from zone 40 by means of line 36 together with the streams removed by means of lines 31, 32, 33, 34 and 35 are handled in a manner as previously described to recover segregated solid particles. That portion of the less buoyant stream recycled to fluidization zone 10 from fluidization zone 20 is introduced into fluidization zone 10 at a point intermediate the points of withdrawal of the more buoyant and intermediate buoyant streams from zone 10. In a similar manner that portion of the less buoyant stream recycled to fluidization zone 10 from fluidization zone 30 is introduced into fluidization zone 10 at a point intermediate the point of withdrawal of the intermediate buoyant stream and the least buoyant stream from zone 10.

It is within the scope of my invention to use more than two fluidization zones in series. The method of handling the respective streams together with the number of fluidization zones employed, either in series or parallel, will depend upon the nature of the solid particles to be segregated, and upon the particle size distribution and actual particle size desired in the final segregated fractions. Similarly, the type of packing with respect to size and the like will also depend upon the above enumerated factors.

The process of the present invention is not to be limited by any theory as to mode of operation, but only in and by the following claims in which it is desired to claim all novelty insofar as the prior art permits.

Attention is called to applicant's co-pending application Serial No. 689,705 which covers broadly the fluidization of finely divided solids in the presence of a solid mass of packing material.

I claim:

1. Process for the segregation of a mixture of finely divided solids which comprises introducing finely divided solids having a particle size distribution, such that at least 88% are between 20 and 200 microns and the remaining are below 20 microns, into a contacting zone containing a substantially nontransitory mass of solids in relatively coarse particle form, each of the nontransitory particles being at least 10 times as large as the largest of the particles of finely divided solids, the nontransitory particles forming interstices having a length as compared to diameter of not greater than 15 to 1 and a diameter greater than the largest particle of the finely divided solids, passing gaseous fluids upwardly through said contacting zone at a velocity between 0.1 and 4 feet per second so that said finely divided solids are stratified with respect to their buoyancies throughout said contacting zone and separately withdrawing from said contacting zone a plurality of streams of different sized solid particles.

2. Process for the segregation of a mixture of finely divided solids which comprises introducing finely divided solids having a particle size distribution, such that at least 88% are between 20 and 200 microns and the remaining are below 20 microns, into a first contacting zone containing a substantially nontransitory mass of solids in relatively coarse particle form, each of the nontransitory particles being at least 10 times as large as the largest of the particles of finely divided solids, the nontransitory particles forming interstices having a length as compared to diameter of not greater than 15 to 1 and a diameter greater than the largest particle of the finely divided solids, passing gaseous fluids upwardly through said contacting zone at a velocity between 0.1 and 4 feet per second so that said finely divided solids are stratified with respect to their buoyancies throughout said contacting zone, withdrawing streams of finely divided solids at various points from said first contacting zone, passing said streams to secondary contacting zones containing a nontransitory mass of solids having the same general characteristics as those in the said first zone, passing gaseous fluids upwardly through said secondary contacting zones at velocities between 0.1 and 4 feet per second so that said subdivided solids are stratified with respect to their buoyancies throughout said secondary contacting zones and withdrawing from said secondary contacting zones streams of finely divided solids having different particle sizes and buoyancies.

3. Process for the segregation of a mixture of finely divided solids which comprises introducing finely divided solids having a particle size distribution, such that at least 88% are between 20 and 200 microns and the remaining are below 20 microns, into a first contacting zone containing a substantially nontransitory mass of solids in relatively coarse particle form, each of the nontransitory particles being at least 10 times as large as the largest of the particles of finely divided solids, the nontransitory particles forming interstices having a length as compared to diameter of not greater than 15 to 1 and a diameter greater than the largest particle of the finely divided solids, passing gaseous fluids upwardly through said contacting zone at a velocity between 0.1 and 4 feet per second so that said finely divided solids are stratified with respect to their buoyancies throughout said contacting zone, withdrawing from said first contacting zone a stream of particles having a relatively small size and high buoyancy, withdrawing from said first contacting zone a stream of particles having an intermediate size, withdrawing from said first contacting zone heavier particles having a lower buoyancy, passing said stream containing the more buoyant particles and said stream containing the less buoyant particles to separate secondary contacting zones containing a nontransitory mass of solids having the same general characteristics as those in the first contacting zone, passing gaseous fluids upwardly through said secondary contacting zones at a velocity between 0.1 and 4 feet per second, thereby securing a gradient in said zones of particles with respect to their particle sizes and densities, withdrawing from said secondary contacting zone into which the more buoyant particles are introduced a heavier stream of particles and combining this stream with said stream of intermediate particles withdrawn from said initial contacting zone, withdrawing from said secondary contacting zone into which the less buoyant particles are introduced a more buoyant particle stream and combining this stream with the stream of intermediate sized particles withdrawn from said first contacting zone and recovering the respective streams.

4. Process according to claim 3 in which the particles of the nontransitory solids in the first zone are smaller than those in the secondary zones.

5. Process for the segregation of a mixture of finely divided solids which comprises introducing finely divided solids having a particle size distribution, such that at least 88% are between 20 and 200 microns and the remaining are below 20 microns, into a first contacting zone containing a substantially nontransitory mass of solids in relatively coarse particle form, each of the nontransitory particles being at least 10 times as large as the largest of the particles of finely divided solids, the nontransitory particles forming interstices having a length as compared to diameter of not greater than 15 to 1 and a diameter greater than the largest particle of the finely divided solids, passing gaseous fluids upwardly through said contacting zone at a velocity between 0.1 and 4 feet per second so that said finely divided solids are stratified with respect to their buoyancies throughout said contacting zone, withdrawing from first contacting zone a segregated stream of said particles, passing said stream through a second contacting zone containing a nontransitory mass of solids having the same general characteristics as those in the first contacting zone, passing gaseous fluids upwardly through said contacting zone at a velocity between 0.1 and 4 feet per second, whereby the particles in said stream in said second contacting zone are stratified with respect to their sizes and weights, withdrawing a less buoyant heavier stream from said second contacting zone and recycling at least a portion of said stream to said first contacting zone.

GEORGE L. MATHESON.

REFERENCES CITED

The following references are of record in the file of this patent:

UNITED STATES PATENTS

| Number | Name | Date |
|---|---|---|
| Re. 21,653 | Bigalow | Dec. 10, 1940 |
| 347,867 | Card | Aug. 24, 1886 |
| 1,984,380 | Odell | Dec. 18, 1934 |
| 2,101,295 | Rusk | Dec. 7, 1937 |
| 2,154,784 | Stump | Apr. 18, 1939 |
| 2,307,064 | Patterson | Jan. 5, 1943 |
| 2,310,894 | Brusset | Feb. 9, 1943 |
| 2,367,694 | Snuggs | Jan. 23, 1945 |
| 2,383,636 | Wurth | Aug. 28, 1945 |
| 2,394,814 | Snuggs | Feb. 12, 1946 |
| 2,432,745 | Gary | Dec. 16, 1947 |
| 2,436,225 | Ogozaly et al. | Feb. 17, 1948 |
| 2,443,673 | Attwell | June 22, 1948 |
| 2,444,990 | Hemminger | July 13, 1948 |
| 2,448,290 | Attwell | Aug. 31, 1948 |

FOREIGN PATENTS

| Number | Country | Date |
|---|---|---|
| 299,936 | Great Britain | Nov. 8, 1928 |